(12) United States Patent
Preisler et al.

(10) Patent No.: US 8,795,807 B2
(45) Date of Patent: Aug. 5, 2014

(54) ASSEMBLY INCLUDING A COMPRESSION-MOLDED COMPOSITE COMPONENT HAVING A SANDWICH STRUCTURE AND A UNITARILY CONNECTED SECOND COMPONENT

(71) Applicant: Global IP Holdings, LLC, Sterling Heights, MI (US)

(72) Inventors: Darius J. Preisler, Macomb, MI (US); Christopher A. Heikkila, Washington Township, MI (US)

(73) Assignee: Global IP Holdings, LLC, Sterling Heights, MI (US)

( * ) Notice: Subject to any disclaimer, the term of this patent is extended or adjusted under 35 U.S.C. 154(b) by 58 days.

(21) Appl. No.: 13/688,972

(22) Filed: Nov. 29, 2012

(65) Prior Publication Data

US 2014/0147617 A1    May 29, 2014

(51) Int. Cl.
    *B32B 3/26*      (2006.01)
    *B32B 3/12*      (2006.01)
    *B32B 3/06*      (2006.01)
    *B32B 7/06*      (2006.01)
    *B62D 25/00*      (2006.01)
    *B32B 7/08*      (2006.01)
    *B32B 7/04*      (2006.01)
    *B62D 25/20*      (2006.01)

(52) U.S. Cl.
    CPC . *B32B 3/263* (2013.01); *B32B 3/06* (2013.01); *B32B 7/06* (2013.01); *B62D 25/00* (2013.01); *B32B 7/08* (2013.01); *B32B 7/045* (2013.01); *B62D 25/2054* (2013.01); *B32B 3/12* (2013.01)
    USPC .......... 428/99; 296/39.1; 296/39.2; 296/39.3; 296/97.23; 428/95; 428/98; 428/116

(58) Field of Classification Search
    CPC .......... A47G 27/02; B29C 43/00; B32B 3/02; B32B 3/04; B32B 3/12; B32B 3/263; B60R 5/00; B60R 5/04; B60R 13/00; B60R 13/011; B62D 25/20
    USPC .............. 428/95, 98, 99, 116; 296/39.1, 39.2, 296/39.3, 97.23
    See application file for complete search history.

(56) References Cited

U.S. PATENT DOCUMENTS 6,050,630 A     4/2000     Hochet
6,537,413 B1     3/2003     Hochet et al.

(Continued)

OTHER PUBLICATIONS

Office Action; related U.S. Appl. No. 13/479,974; date of mailing Mar. 20, 2014.

(Continued)

*Primary Examiner* — Brent O'Hern
(74) *Attorney, Agent, or Firm* — Brooks Kushman P.C.

(57) ABSTRACT

A unitary structural assembly including a first component having a plateau-receiving aperture and a compression-molded, composite second component having a sandwich structure is provided. The second component includes a first outer layer, a second outer layer, and a core positioned between the outer layers and having a large number of cavities. The outer layers are bonded to the core by a press molding. A portion of the second component including the first layer and the core defines a raised plateau having upper and side surfaces. The plateau has a size and shape corresponding to the size and shape of the plateau-receiving aperture. A height of the plateau corresponds to the depth of the plateau-receiving aperture. The plateau is inserted into the plateau-receiving aperture so that corresponding surfaces of the plateau and the plateau-receiving aperture are in abutting engagement to unitarily connect the components and form the assembly.

18 Claims, 4 Drawing Sheets

(56) References Cited

U.S. PATENT DOCUMENTS

| | | | |
|---|---|---|---|
| 6,843,525 B2 | 1/2005 | Preisler | |
| 6,890,023 B2 | 5/2005 | Preisler et al. | |
| 7,419,713 B2 | 9/2008 | Wilkens et al. | |
| 8,622,456 B2 | 1/2014 | Preisler et al. | |
| 8,690,233 B2 | 4/2014 | Preisler et al. | |
| 2003/0079659 A1* | 5/2003 | Preisler et al. | 108/51.3 |
| 2005/0189674 A1 | 9/2005 | Hochet et al. | |
| 2010/0026031 A1 | 2/2010 | Jouraku | |
| 2013/0278002 A1 | 10/2013 | Preisler et al. | |
| 2013/0278003 A1 | 10/2013 | Preisler et al. | |
| 2013/0278009 A1 | 10/2013 | Preisler et al. | |
| 2013/0278015 A1 | 10/2013 | Preisler et al. | |
| 2013/0278018 A1 | 10/2013 | Preisler et al. | |
| 2013/0278019 A1 | 10/2013 | Preisler et al. | |
| 2013/0278020 A1 | 10/2013 | Preisler et al. | |
| 2013/0280469 A1 | 10/2013 | Preisler et al. | |
| 2013/0280472 A1 | 10/2013 | Preisler et al. | |
| 2013/0280473 A1 | 10/2013 | Preisler et al. | |
| 2013/0312652 A1 | 11/2013 | Preisler et al. | |
| 2013/0316123 A1 | 11/2013 | Preisler et al. | |
| 2014/0077518 A1 | 3/2014 | Preisler et al. | |
| 2014/0077530 A1 | 3/2014 | Preisler et al. | |
| 2014/0077531 A1 | 3/2014 | Preisler et al. | |
| 2014/0145465 A1 | 5/2014 | Preisler et al. | |
| 2014/0145470 A1 | 5/2014 | Preisler et al. | |
| 2014/0147617 A1 | 5/2014 | Preisler et al. | |
| 2014/0147622 A1 | 5/2014 | Preisler et al. | |

OTHER PUBLICATIONS

Office Action; related U.S. Appl. No. 13/686,362; date of mailing Mar. 25, 2014.
Office Action; related U.S. Appl. No. 13/523,253; date of mailing Mar. 25, 2014.
Office Action; related U.S. Appl. No. 13/688,972; date of mailing Mar. 28, 2014.
Office Action; related U.S. Appl. No. 13/687,232; date of mailing Mar. 28, 2014.
Office Action; related U.S. Appl. No. 13/689,809; date of mailing Mar. 31, 2014.
Office Action; related U.S. Appl. No. 13/687,213; date of mailing Mar. 31, 2014.
Office Action; related U.S. Appl. No. 13/690,265; date of mailing Mar. 31, 2014.
Office Action; related U.S. Appl. No. 13/762,904; date of mailing Apr. 8, 2014.
Office Action; related U.S. Appl. No. 13/762,800; date of mailing Apr. 8, 2014.
Office Action; related U.S. Appl. No. 13/762,861; date of mailing Apr. 9, 2014.
Office Action; related U.S. Appl. No. 13/690,566; date of mailing Apr. 9, 2014.
Office Action; related U.S. Appl. No. 13/762,832; date of mailing Apr. 11, 2014.
Office Action; related U.S. Appl. No. 13/762,921; date of mailing Apr. 14, 2014.
Notice of Allowance; related U.S. Appl. No. 13/686,388; date of mailing Apr. 15, 2014.
Related U.S. Appl. No. 13/690,566, filed Nov. 30, 2012.
Related U.S. Appl. No. 13/762,921, filed Feb. 8, 2013.
Related U.S. Appl. No. 13/762,956, filed Feb. 8, 2013.
Office Action; related U.S. Appl. No. 13/453,201 (now USPN 8,690,233); date of mailing Nov. 20, 2013.
Office Action; related U.S. Appl. No. 13/523,209 (now USPN 8,622,456) date of mailing Apr. 29, 2013.

* cited by examiner

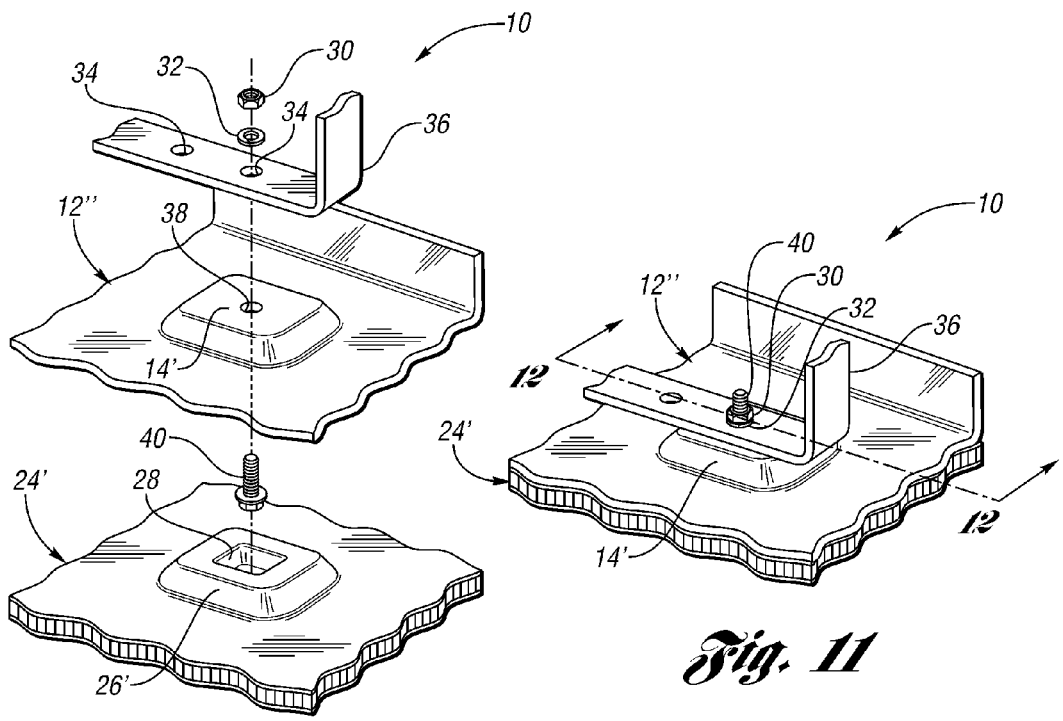
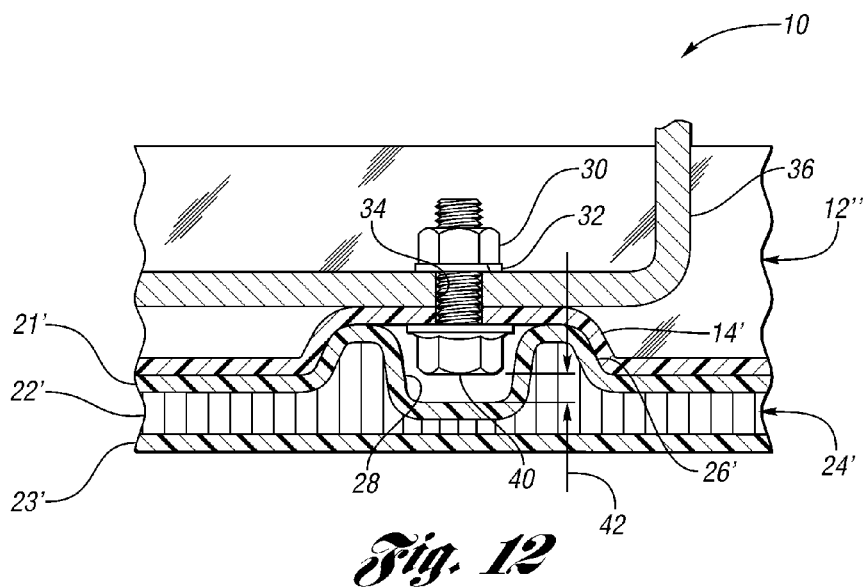

ASSEMBLY INCLUDING A COMPRESSION-MOLDED COMPOSITE COMPONENT HAVING A SANDWICH STRUCTURE AND A UNITARILY CONNECTED SECOND COMPONENT

TECHNICAL FIELD OF THE INVENTION

This invention generally relates to assemblies including compression-molded composite components having sandwich structures and, in particular, to such assembles which have unitarily connected components.

OVERVIEW

Some compression-molded composites combine a lightweight, low-density core with fiber-reinforced thermoplastic skins or outer layers thereby resulting in a sandwich structure. The resulting composite component has a high stiffness-to-weight ratio thereby making it desirable for use in a wide variety of applications including load-bearing applications. In general, the thicker the core, the higher the load-bearing capacity of the composite component.

As a result of their high stiffness-to-weight ratio and load-bearing capacity, such compression-molded composites have been used as load floors in automotive applications and as skis or snowboards (i.e, sliding boards) in recreational applications.

One problem associated with such composites is that their function and design freedom is limited by their designed material thickness.

It is often highly desirable to secure hardware and other components to composite components. In automotive applications, such as rear load-bearing load floors, it is desirable to provide attachment mechanisms at various locations to secure cargo to protect the cargo from sliding, rolling, etc. which tends to damage the cargo as well as other items or structures in the cargo area.

Because of the large forces that cargo as well as individuals can exert on the load floor, any attachment or fastening mechanism must be able to withstand not only large pull-out forces but also large push-in forces. Also, such attachment or fastening mechanisms must be able to withstand large torque forces to prevent the mechanisms from being "torqued out" of or "torqued into" the composite components.

The following U.S. patent documents are related to the present invention: U.S. Pat. Nos. 7,419,713; 6,890,023; 6,843,525; 6,537,413; 6,050,630; and 2005/0189674.

SUMMARY OF EXAMPLE EMBODIMENTS

An object of at least one embodiment of the present invention is to provide an assembly including a first component and a compression-molded composite second component having a sandwich structure wherein portions of the components allow the components to be unitarily connected with improved assembling workability and increased design freedom.

In carrying out the above object and other objects of at least one embodiment of the present invention, a unitary structural assembly is provided. The assembly includes a first component having lower and side surfaces which define a plateau-receiving aperture having a size, a shape and a depth. The assembly also includes a compression-molded, composite second component having a sandwich structure. The second component includes a first outer layer, a second outer layer and a core positioned between the outer layers and having a large number of cavities. The outer layers are bonded to the core by a press molding. A portion of the second component including the first layer and the core defines a raised plateau having upper and side surfaces. The plateau has a size and shape corresponding to the size and shape of the plateau-receiving aperture. A height of the plateau corresponds to the depth of the plateau-receiving aperture. The plateau is inserted into the plateau-receiving aperture so that corresponding surfaces of the plateau and the plateau-receiving aperture are in abutting engagement to unitarily connect the components and form the assembly.

The first component may include at least one connector-receiving aperture in communication with the plateau-receiving aperture wherein the assembly further includes at least one connector positioned on or above the raised plateau. Each connector is received and retained within its respective connector-receiving aperture.

The at least one connector may include a plurality of connectors secured to the upper surface of the plateau wherein the first component includes a plurality of holes corresponding in number and relative position to the plurality of connectors.

The connectors may be plastic retaining connectors bonded to the upper surface of the plateau.

Each of the retaining connectors may include a resilient retaining connector and each of the holes may include a connector-receiving socket.

Each of the retaining connectors may include an externally threaded fastener wherein each of the holes is internally threaded.

The at least one connector may be defined by a portion of the core and the first layer.

The at least one connector may include a fastener positioned above the raised plateau and extending completely through the connector-receiving aperture and above an upper surface of the first component to facilitate attachment of an adjacent structure to the assembly.

The fastener may be a threaded fastener such as an externally threaded fastener.

The core may be a cellular core, a thermoplastic core, a honeycomb core, or a thermoplastic honeycomb core.

The outer layers may be fiber-reinforced thermoplastic layers.

The first outer layer may be a load-bearing layer.

Further in carrying out the above object and other objects of at least one embodiment of the present invention, a vehicle interior structural assembly is provided. The assembly includes a first component having lower and side surfaces which define a plateau-receiving aperture having a size, a shape and a depth. The assembly also includes a compression-molded composite second component having a sandwich structure. The second component includes a first outer layer, a second outer layer, and a core positioned between the outer layers and having a large number of cavities. The outer layers are bonded to the core by a press molding. A portion of the second component including the first layer and the core defines a raised plateau having upper and side surfaces. The plateau has a size and shape corresponding to the size and shape of the plateau-receiving aperture. A height of the plateau corresponds to the depth of the plateau-receiving aperture. The plateau is inserted into the plateau-receiving aperture so that corresponding surfaces of the plateau and the plateau-receiving aperture are in abutting engagement to unitarily connect the components and form the assembly.

Still further in carrying out the above object and other objects of at least one embodiment of the present invention, a vehicle load floor assembly is provided. The assembly includes a first component having lower and side surfaces which defines a plateau-receiving aperture having a size, a shape and a depth. The assembly also includes a compression-molded, composite second component having a sandwich structure. The second component includes a first outer layer, a second outer layer, and a core positioned between the outer layers and having a large number of cavities. The outer layers are bonded to the core by a press molding. A portion of the second component including the first layer and the core defines a raised plateau having upper and side surfaces. The plateau has a size and shape corresponding to the size and shape of the plateau-receiving aperture. Height of the plateau corresponds to the depth of the plateau-receiving aperture. The plateau is inserted into the plateau-receiving aperture so that corresponding surfaces of the plateau and the plateau-receiving aperture are in abutting engagement to unitarily connect the components and form the assembly.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

BRIEF DESCRIPTION OF THE DRAWINGS

FIG. 10 is a view, similar to the views of FIGS. 1, 4 and 7, of a fourth embodiment of the invention;

FIG. 11 is a view, similar to the views of FIGS. 2, 5 and 8, of the fourth embodiment; and FIG. 12 is a view, similar to the views of FIGS. 3, 6 and 9, taken along lines 12-12 of FIG. 11.

DETAILED DESCRIPTION OF EXAMPLE EMBODIMENTS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
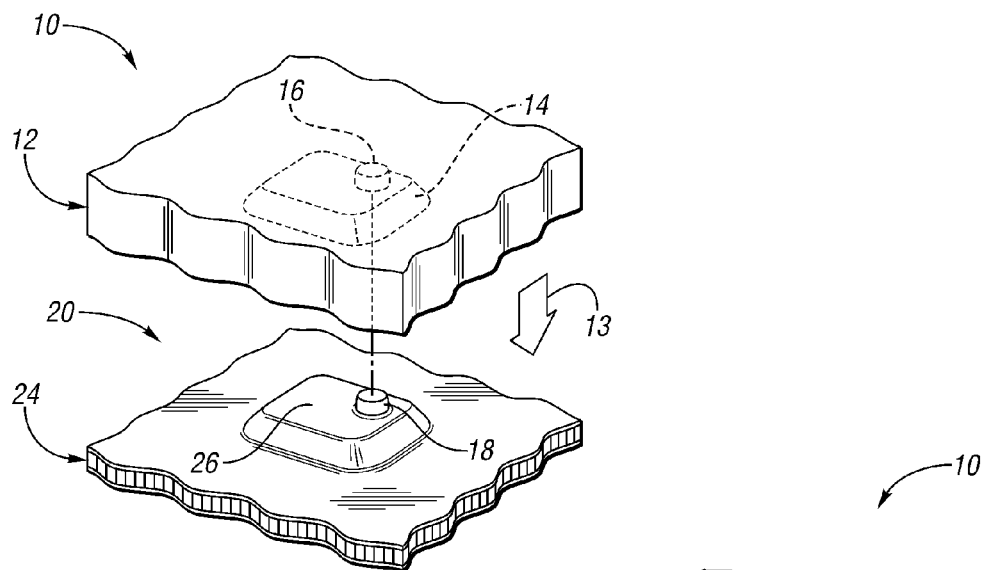
FIG. 1 is a perspective view, partially broken away and in cross section, of the unassembled components of a unitary structural assembly, such as a load floor assembly, constructed in accordance with at least one embodiment of the present invention and also indicating an abutting direction within a white arrow.
Figure 2:
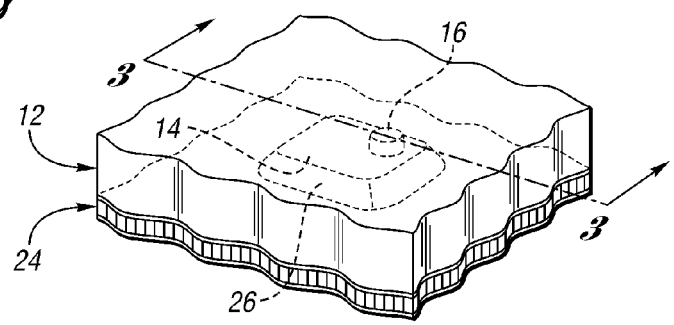
FIG. 2 is a view, similar to the view of FIG. 1, but with the components assembled.
Figure 3:
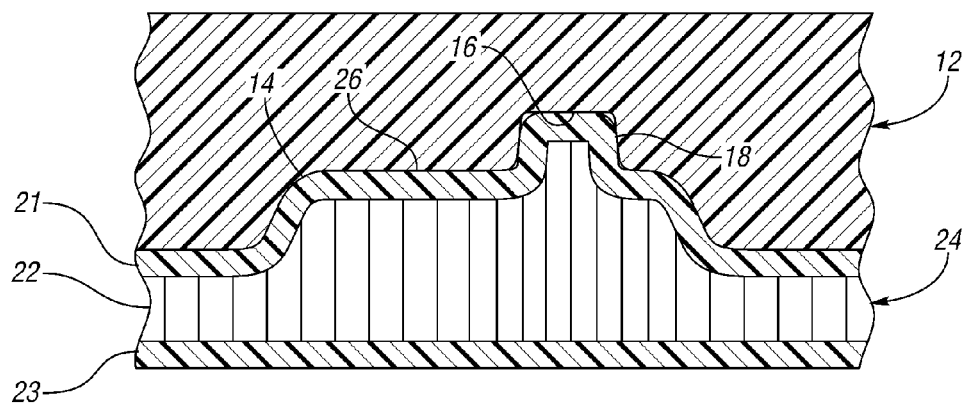
FIG. 3 is a view, partially broken away and in cross section, of the assembly of FIG. 2 taken along lines 3-3.

Referring now to the drawing figures, FIGS. 1-3 show a first embodiment of a unitary structural assembly such as a vehicle load floor assembly, generally indicated at 10, which may be positioned or supported at the rear of an automotive vehicle. The assembly 10 includes a solid plastic first component, generally indicated at 12, and a compression-molded second component, generally indicated at 20, having a composite structure. The first component 12 includes a plateau-receiving aperture 14 in communication with a connector-receiving aperture 16.

As shown in FIG. 3, the composite second component 20 includes a composite panel 24 having a load-bearing first outer layer 21, a second outer layer 23, and a core 22 positioned between the outer layers 21 and 23 and having a large number of cavities. The outer layers 21 and 23 are bonded to the core 22 by press molding typically after pre-heating the outer layers 21 and 23. The outer layers 21 and 23 are preferably fiber-reinforced thermoplastic layers. The thermoplastic may be a polyolefin such as polypropylene. The thermoplastic may alternatively be polyurethane. The fiber-reinforcement may be a glass mat, a natural fiber mat, or a woven or non-woven mat.

The core 22 may be a cellular core having a thermoplastic honeycomb structure. The core 22 may also be made of polypropylene honeycomb, aluminum honeycomb, balsa and polyurethane foam. The resulting composite component 20 typically includes a lightweight, low density core such as the core 22 together with fiber-reinforced thermoplastic skins or layers such as the layers 21 and 23.

The composite component 20 may be compression or press molded using a variety of technologies which use a low temperature, compression molding apparatus. For example, the core 22 and the layers 21 and 23 are preferably generally of the type shown in U.S. Pat. Nos. 6,537,413; 6,050,630; and 2005/0189674.

After compression or press molding, at least one plateau 26 and a connector 18 are formed by the layer 21 and the core 22. During such molding, the areas about the plateau 26 and the connector 18 are crushed to reduce the thickness of those crushed areas.

After such molding, the first and second components 12 and 20 are ready to be joined or connected by moving the components 12 and 20 relative to each other in the direction of the white arrow 13 shown in FIG. 1. In this way, the plateau 26 of the second component 20 is inserted into the plateau-receiving aperture 14 of the first component 12 so that corresponding surfaces of the plateau 26 and the plateau-receiving aperture 14 are in abutting engagement to connect the components 12 and 20 and form the assembly 10 as shown in FIGS. 2 and 3.

During insertion, the connector 18 is also inserted into the connector-receiving aperture 16 to properly locate the components 12 and 20 relative to each other. The connector 18 is received and retained within the connector-receiving aperture 16 and are also in abutting engagement to help connect the components 12 and 20 together to form the assembly 10.

Figure 4:
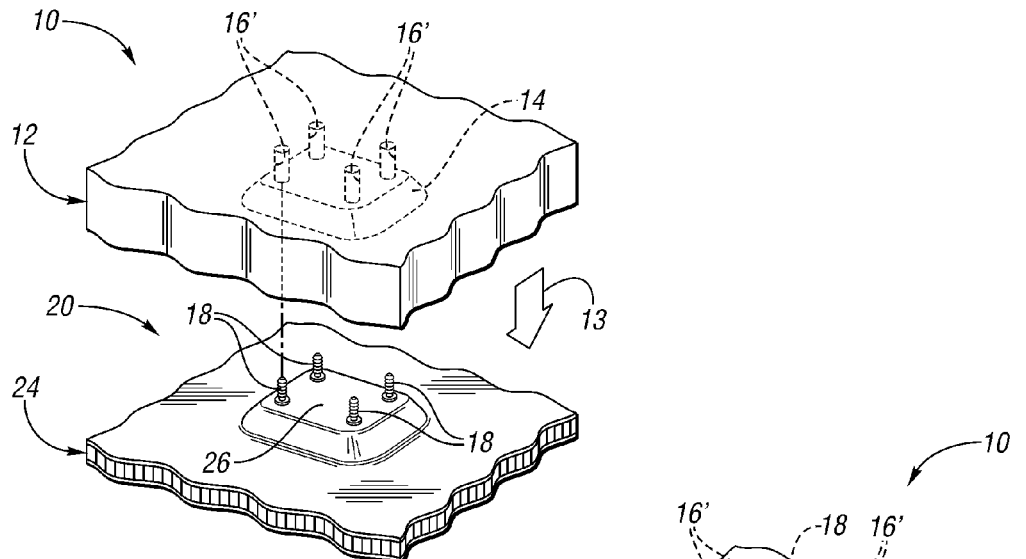
FIG. 4 is a view, similar to the view of FIG. 1, of a second embodiment of the invention.
Figure 5:
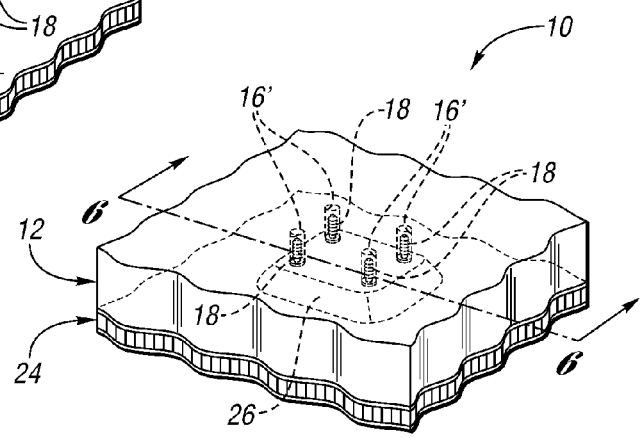
FIG. 5 is a view, similar to the view of FIG. 2, of the second embodiment.
Figure 6:
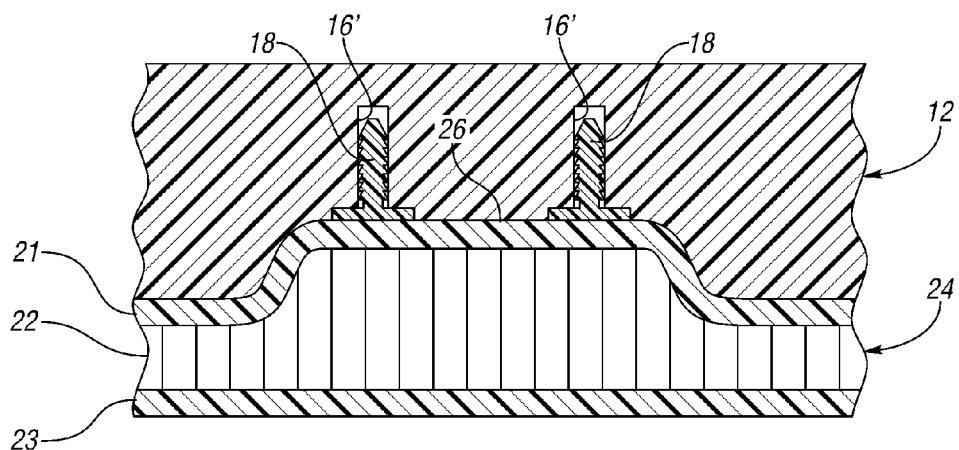
FIG. 6 is a view, similar to the view of FIG. 3, but taken along the lines 6-6 of FIG. 5.

Referring now to FIGS. 4-6, a second unitary structural assembly 10 is shown similar to the first unitary structural assembly of FIGS. 1-3 except instead of the single integrally formed converter 18 and the connector-receiving aperture 16 of FIGS. 1-3, a plurality of plastic threaded fasteners 18 are secured to the top surface of the plateau 26 such as by bonding. Similarly, a plurality of threaded holes 16' are formed in the lower surface of the first component 12 of FIGS. 4-6, the holes 16' corresponding in number and relative position to the connectors 18 to fasten the first and second components 12 and 20 together.

Figure 7:
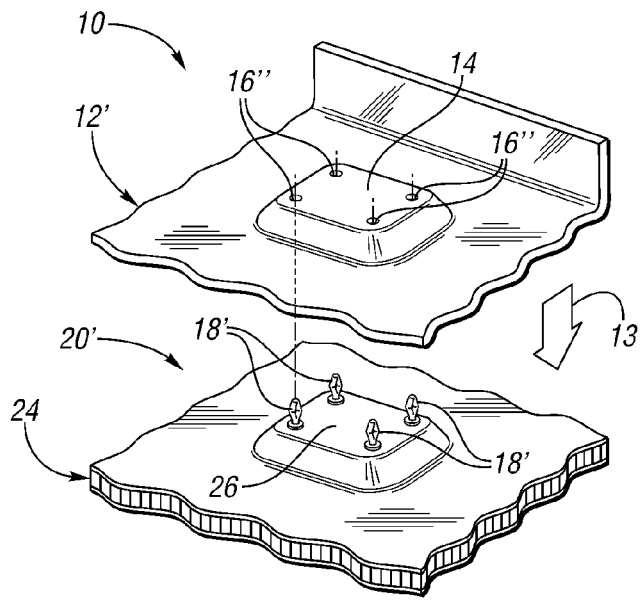
FIG. 7 is a view, similar to the views of FIGS. 1 and 4, of a third embodiment of the invention.
Figure 8:
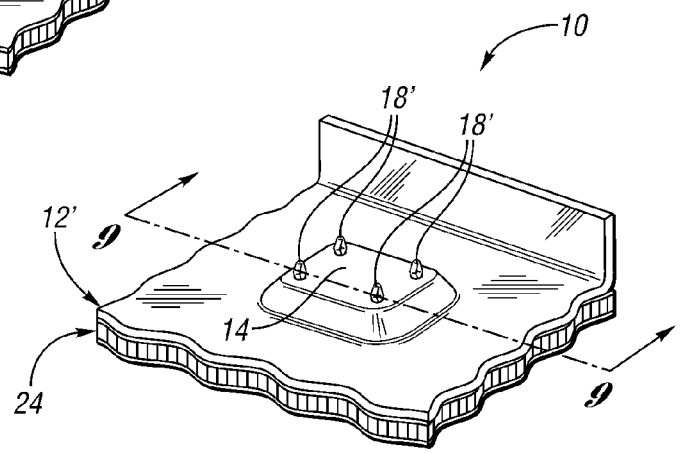
FIG. 8 is a view, similar to the views of FIGS. 2 and 5, of the third embodiment.
Figure 9:
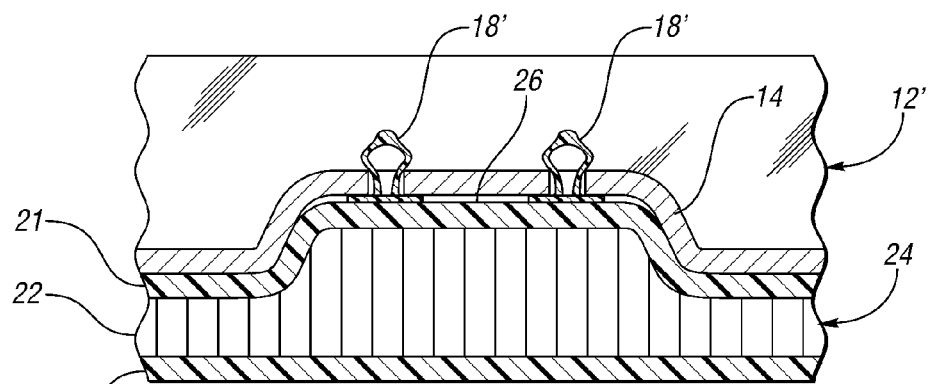
FIG. 9 is a view, similar to the views of FIGS. 3 and 6, taken along lines 9-9 of FIG. 8.

Referring now to FIGS. 7-9, a third unitary structural assembly 10 is shown similar to the second unitary assembly 10 of FIGS. 4-6 except instead of a plurality of plastic externally threaded fasteners 18, a plurality of resilient plastic retaining connectors 18' are bonded to the top surface of the plateau 26 of the second component 20'. Similarly, a plurality of connector-receiving sockets 16" are formed through a plateau-like portion 14 of the first component 12' to secure the connection between the components 12' and 20' via the connectors 18'.

Referring now to FIGS. 10-12, a fourth unitary structural assembly 10 is shown, similar to the third assembly 10 of FIGS. 7-9 and the first assembly 10 of FIGS. 1-3 except one or more connectors are not formed on or bonded to the plateau 14' but rather the plateau 26' is formed with a central depression 28 to allow a connector, such as an externally threaded bolt 40, to be positioned above a lower surface of the depression by an amount 42. A head of the bolt 40 is located within the depression 28. The bolt 40 extends through a central hole 38 in a plateau 14' of the first component 12" and through a selected hole 34 formed through a metal bracket 36 to connect the bracket 36 to the assembly 10. A washer 32 and a nut 30 secure the connection between the bracket 36 and the first component 12".

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A unitary structural assembly comprising:
    a first component having lower and side surfaces which define a plateau-receiving aperture having a size, a shape and a depth; and
    a compression-molded, composite second component having a sandwich structure, the second component including a first outer layer, a second outer layer, and a core positioned between the outer layers and having a plurality of cavities wherein the outer layers are bonded to the core by a press molding, wherein a portion of the second component including the first layer and the core defines a raised plateau having upper and side surfaces, the plateau having a size and shape corresponding to the size and shape of the plateau-receiving aperture, wherein a height of the plateau corresponds to the depth of the plateau-receiving aperture and wherein the plateau is inserted into the plateau-receiving aperture so that corresponding surfaces of the surfaces of plateau and the plateau-receiving aperture are in abutting engagement to unitarily connect the components and form the assembly.

2. The assembly as claimed in claim 1, wherein the first component includes at least one connector-receiving aperture in communication with the plateau-receiving aperture and wherein the assembly further comprises at least one connector positioned on or above the raised plateau, each connector being received and retained within its respective connector-receiving aperture.

3. The assembly as claimed in claim 2, wherein the at least one connector includes a plurality of connectors secured to the upper surface of the plateau and wherein the first component includes a plurality of holes corresponding in number and relative position to the plurality of connectors.

4. The assembly as claimed in claim 3, wherein the connectors are plastic retaining connectors bonded to the upper surface of the plateau.

5. The assembly as claimed in claim 4, wherein each of the retaining connectors comprises a resilient retaining connector and each of the holes comprises a connector-receiving socket.

6. The assembly as claimed in claim 4, wherein each of the retaining connectors comprises an externally threaded fastener and wherein each of the holes is internally threaded.

7. The assembly as claimed in claim 2, wherein the at least one connector is defined by a portion of the core and the first layer.

8. The assembly as claimed in claim 2, wherein the at least one connector comprises a fastener positioned above the raised plateau and extending completely through the connector-receiving aperture and above an upper surface of the first component to facilitate attachment of an adjacent structure to the assembly.

9. The assembly as claimed in claim 8, wherein the fastener is a threaded fastener.

10. The assembly as claimed in claim 9, wherein the fastener is an externally threaded fastener.

11. The assembly as claimed in claim 1, wherein the core is a cellular core.

12. The assembly as claimed in claim 1, wherein the core is a thermoplastic core.

13. The assembly as claimed in claim 1, wherein the core is a honeycomb core.

14. The assembly as claimed in claim 13, wherein the honeycomb core is a thermoplastic honeycomb core.

15. The assembly as claimed in claim 1, wherein the outer layers are fiber-reinforced thermoplastic layers.

16. The assembly as claimed in claim 1, wherein the first outer layer is a load-bearing layer.

17. A vehicle interior structural assembly comprising:
    a first component having lower and side surfaces which define a plateau-receiving aperture having a size, a shape and a depth; and
    a compression-molded, composite second component having a sandwich structure, the second component including a first outer layer, a second outer layer, and a core positioned between the outer layers and having a plurality of cavities wherein the outer layers are bonded to the core by a press molding, wherein a portion of the second component including the first layer and the core defines a raised plateau having upper and side surfaces, the plateau having a size and shape corresponding to the size and shape of the plateau-receiving aperture and wherein a height of the plateau corresponds to the depth of the plateau-receiving aperture and wherein the plateau is inserted into the plateau-receiving aperture so that corresponding surfaces of the plateau and the plateau-receiving aperture are in abutting engagement to unitarily connect the components and form the assembly.

18. A vehicle load floor assembly comprising:
    a first component having lower and side surfaces which defines a plateau-receiving aperture having a size, a shape and a depth; and
    a compression-molded, composite second component having a sandwich structure, the second component including a first outer layer, a second outer layer, and a core positioned between the outer layers and having a plurality of cavities wherein the outer layers are bonded to the core by a press molding, wherein a portion of the second component including the first layer and the core defines a raised plateau having upper and side surfaces, the plateau having a size and shape corresponding to the size and shape of the plateau-receiving aperture and wherein height of the plateau corresponds to the depth of the plateau-receiving aperture and wherein the plateau is inserted into the plateau-receiving aperture so that corresponding surfaces of the plateau and the plateau-receiving aperture are in abutting engagement to unitarily connect the components and form the assembly.

* * * * *